(12) United States Patent
Boddu et al.

(10) Patent No.: US 10,802,737 B2
(45) Date of Patent: Oct. 13, 2020

(54) SYSTEM AND PROCESSES FOR DYNAMIC OBJECT ROUTING

(71) Applicant: Cloudian Holdings, Inc., San Mateo, CA (US)

(72) Inventors: Bharatendra Boddu, San Mateo, CA (US); Balaji Ganesan, San Mateo, CA (US)

(73) Assignee: Cloudian Holdings, Inc., San Mateo, CA (US)

( * ) Notice: Subject to any disclaimer, the term of this patent is extended or adjusted under 35 U.S.C. 154(b) by 0 days.

(21) Appl. No.: 15/411,847

(22) Filed: Jan. 20, 2017

(65) Prior Publication Data

US 2017/0220290 A1  Aug. 3, 2017

Related U.S. Application Data

(60) Provisional application No. 62/289,871, filed on Feb. 1, 2016.

(51) Int. Cl.
| | | |
|---|---|---|
| *G06F 3/06* | (2006.01) | |
| *G06F 11/34* | (2006.01) | |
| *G06F 9/50* | (2006.01) | |

(52) U.S. Cl.
CPC .......... *G06F 3/0635* (2013.01); *G06F 3/0605* (2013.01); *G06F 3/067* (2013.01); *G06F 9/5083* (2013.01); *G06F 11/3433* (2013.01)

(58) Field of Classification Search
CPC .... G06F 3/0635; G06F 3/0683; G06F 3/0604; G06F 9/5083; G06F 11/3433
See application file for complete search history.

(56) References Cited

U.S. PATENT DOCUMENTS

| | | | | |
|---|---|---|---|---|
| 7,277,897 | B2 * | 10/2007 | Bamford | G06F 9/5083 707/782 |
| 2005/0193084 | A1 * | 9/2005 | Todd | G06F 3/0607 709/214 |

* cited by examiner

*Primary Examiner* — David Yi
*Assistant Examiner* — Alan Otto
(74) *Attorney, Agent, or Firm* — Crowell & Moring LLP

(57) ABSTRACT

A computer-implemented process is disclosed for dynamically routing data objects to storage locations. The process includes assigning a unique identifier value and a timestamp value to an incoming data object. The process further includes determining a bucket for the data object based on the unique identifier value. The process further includes determining a storage location for the data object from among a plurality of storage locations, wherein the determination is based on the bucket and the timestamp value. The process further includes routing the data object to the storage location for storage therein.

16 Claims, 5 Drawing Sheets

SYSTEM AND PROCESSES FOR DYNAMIC OBJECT ROUTING

CROSS REFERENCE TO RELATED APPLICATIONS

This application claims the benefit of U.S. Provisional Application No. 62/289,871, filed on Feb. 1, 2016, the entire contents of which are hereby incorporated by reference.

FIELD OF THE INVENTION

The disclosed invention relates to data object storage systems and processes for the dynamic routing of data objects.

BACKGROUND OF THE INVENTION

Data object storage systems are known for storing data among multiple storage locations. In object store systems, data objects are typically identified by unique identifiers. A common methodology to generate unique identifiers is to use a hashing algorithm. Objects on disks are also typically immutable—so that modifications to existing objects result in new objects being created on the disk.

A common methodology of distributing objects to storage nodes is by using a consistent hashing scheme. In a consistent hashing scheme, objects and storage nodes are mapped to hash values using the same hash function, and the hash value space is treated as a circular space (i.e., a ring) where the largest hash value is followed by the smallest hash value. Each storage node's position in the hash value space determines the objects stored on it. To minimize the data movement when storage nodes are added or removed, each storage node may be assigned with multiple positions in the hash value space. A storage node can be associated with one or more disks on which to store the objects assigned to the node. Objects are mapped to disks by assigning each disk with the position of the storage node (i.e., the hash bucket).

A typical data object storage system 1 operating according to a hashing scheme is illustrated in FIG. 1. Data objects 8 are correlated with hash values 3. A range of such has values defines a hash bucket 5. Each hash bucket is correlated with a storage node $2_{I-J}$ ("2"). The hash value—and in turn the hash bucket—thus indicates which storage node the data object is to be stored in. The hash value also indicates the position at which the data object is stored within the hash bucket. The correlation between each hash bucket and each storage node is provided by a mapping table 7 stored in a memory 4.

When a data object is retrieved from the storage nodes (or associated disks), the system identifies the hash bucket associated with the data object by making use of the data object's hash vale, then identifies the storage node (and disk location) where the data object is stored by referencing the mapping table. In other words, the system looks up in the mapping table which storage node the identified hash bucket is associated with. Once the storage node is identified, the system retrieves the data object from it.

Based on the application usage patterns, some hash buckets may grow faster than others. On a storage node, this means that some disks are more used than others. When a hash bucket's associated disk is full, it can no longer store objects assigned to its hash buckets.

Problems thus occur when there is unequal usage of buckets by the system. For example, some data objects may be larger than others such that the rate at which each bucket fills up its associated storage location varies considerably. It may also be the case that although a bucket may have free identifiers, the associated storage location may be full. In such circumstances, the free identifiers cannot be used. This results in the inefficient use of storage space.

The typical solution is to reallocate the hash buckets among the available storage nodes (or disks) by modifying the mapping table. A hash bucket previously associated with a full storage node may, for example, be reallocated to correspond with a different storage node (or disk) that has more empty space. This, however, requires also moving the previously stored data objects associated with the reallocated hash bucket from the old storage node (or disk) to the new storage node (or disk) set by the modified mapping table. Otherwise, the new mapping table will not be accurate for the already stored data. Needless to say, such data migrations are time consuming, expensive, and inefficient.

It is therefore desirable to provide advantages over such systems.

SUMMARY OF THE INVENTION

A computer-implemented process for dynamically routing data objects to storage locations is provided. A unique identifier value and a timestamp value are assigned to an incoming data object. A bucket for the data object is determined based on the unique identifier value. A storage location for the data object is determined from among a plurality of storage locations, the determination being based on the bucket and the timestamp value. The data object is thereafter routed to the storage location for storage therein.

Other features and advantages of the present invention will become apparent from the following more detailed description, taken in conjunction with the accompanying drawings, which illustrate, by way of example, the principles of the presently described embodiments.

BRIEF DESCRIPTION OF THE DRAWING(S)

DETAILED DESCRIPTION OF THE PREFERRED EMBODIMENTS

Figure 1:
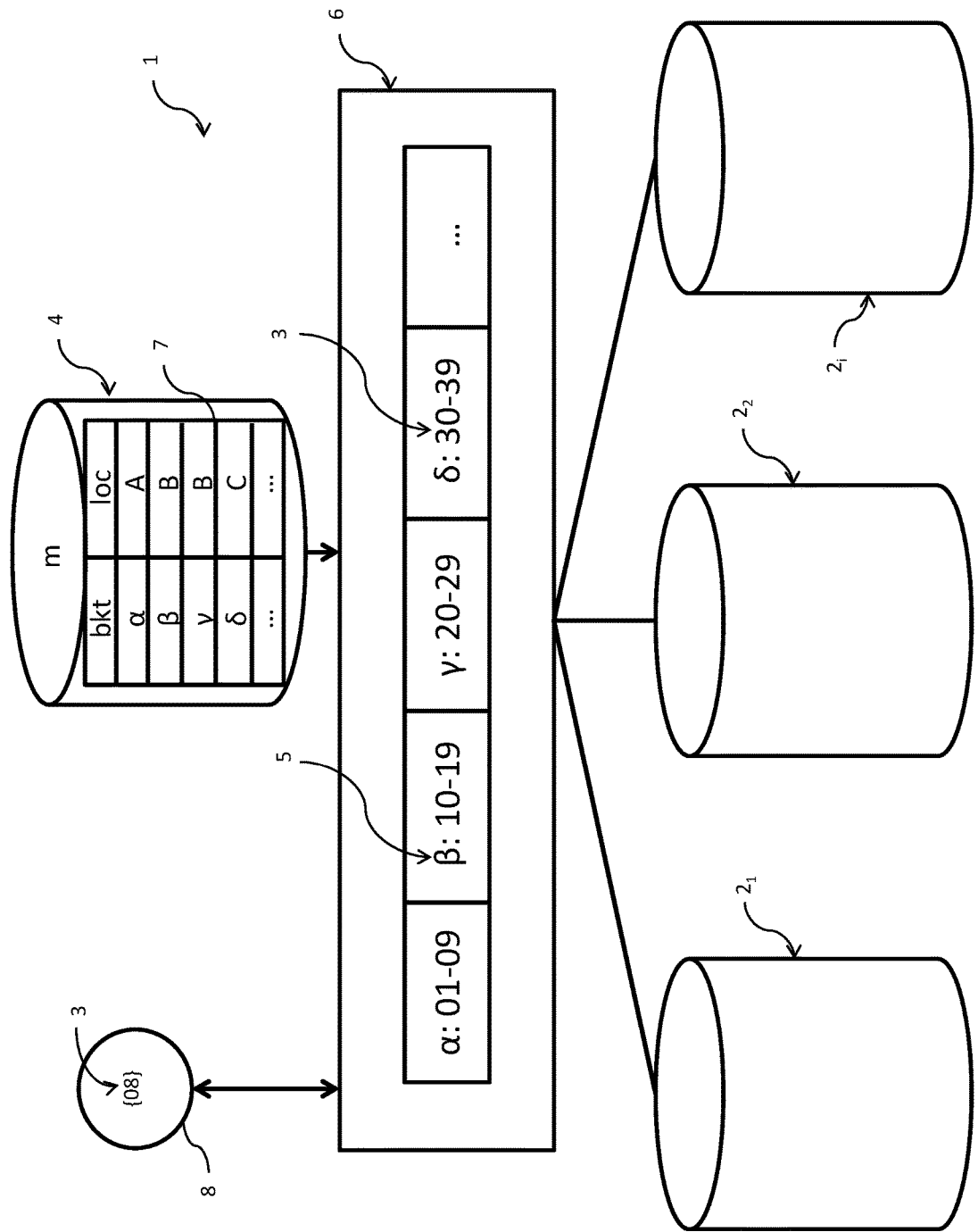
FIG. 1 is a schematic representation of data object storage system according to the prior art.

The above described drawing figures illustrate the disclosed invention in at least one of its preferred, best mode embodiment, which is further defined in detail in the following description. Those having ordinary skill in the art may be able to make alterations and modifications to what is described herein without departing from its spirit and scope. While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspects of the invention to any embodiment illustrated. Therefore, it should be understood that what is illustrated is set forth only for the purposes of example and should not be taken as a limitation on the scope of the disclosed invention.

The described innovation makes use of a timestamp of an incoming data object to dynamically route the data object to an appropriate storage location. A routing table keeps track of which buckets correspond to which storage locations at which times. When the buckets are reallocated amongst the storage locations, the routing table keeps track of the new state and the previous states as a function of time. In other words, if prior to the reallocation, the bucket corresponds to one storage location, and after the reallocation, the bucket corresponds to a different storage location; the routing table keeps track of that. When retrieving the data object from the bucket, the described system determines whether the object's timestamp is pre-reallocation or post-reallocation, and thereby determines which storage location the object is stored in.

In this manner, reallocation of buckets amongst storage locations may be accomplished without the need for data migration between storage locations. The system instead starts storing data objects with post-reallocation timestamps from bucket β, which pre-reallocation would have been stored in storage location A, into storage location B. Based on the routing table, the system goes to storage location B for data objects stored in bucket β with post-reallocation timestamps, and to storage location A for data objects stored in bucket β with pre-reallocation timestamps. No data migration need occur. Moreover, if a storage location is full, a new location can be easily added to take on the overflow. Additionally, if the fill rate between storage locations is uneven, reallocation can easily equalize it.

Figure 2:
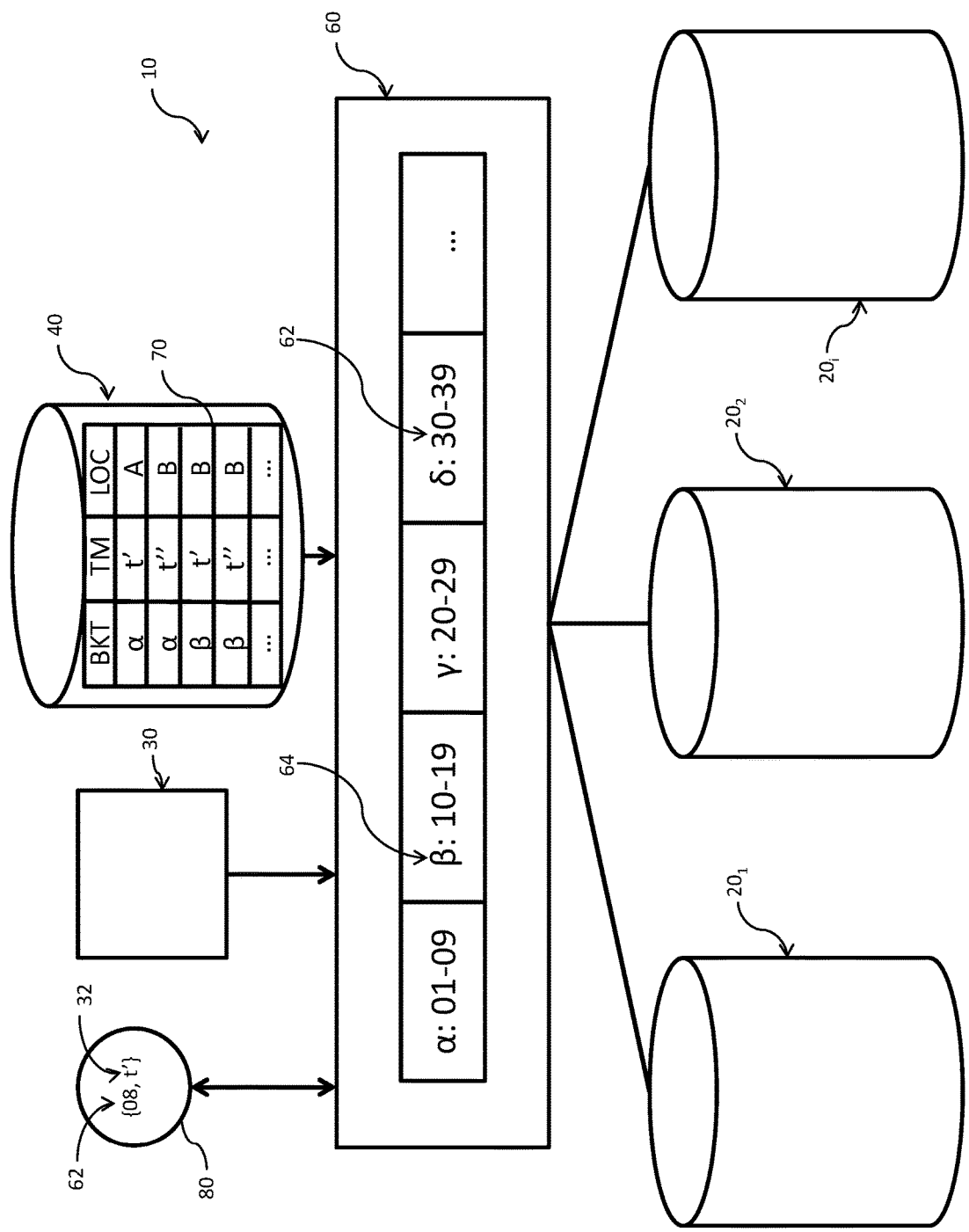
FIG. 2 is schematic representation of a data object storage system according to at least one embodiment of the present invention.

FIG. 2 schematically illustrates a data object storage system 10 according to at least one embodiment of the disclosed invention. The data object storage system 10 comprises: a plurality of storage locations $20_{1-j}$ ("20"); a clock module 30; and a system memory 40, each operatively coupled to a mapping module 50. A processor 90 is operatively coupled to each for effective control thereof in accordance with the embodiments described herein.

The clock module associates incoming data objects 80 with a timestamp 32 representing the time an associated data object 80 is provided to the object storage system 10 for storage. The incoming data objects 80 are uploaded to the system 10 by clients, e.g., using REST API over HTTP protocol. The timestamps 32 are associated with incoming data objects 80 when the data objects 80 are received by the system 10. The timestamps 32 are used to determine which is the latest instance of the data object 80 in the system 10.

The mapping module 50 is configured to associate incoming data objects 80 with respective unique identifiers 62. The memory 40 is configured to retrievably store the associations of each data object 80 with a unique identifier 62. Such associations may in the form of a look-up table (not shown). The memory 40 is also configured to retrievably store a routing table 70, which will be discussed further below.

Each storage location is configured to store data objects 80 therein. Each storage location includes a plurality of storage addresses according to which stored data objects 80 are stored. Each stored data object 80 is associated with a unique storage address. Each unique storage address is associated a unique identifier 62. Exemplary storage locations 20 may include, for example, storage disks, solid state drives, and the like.

The mapping module 50 is configured to maintain an identifier space 60 (e.g., hash value space) comprising a sequence of unique identifiers 62. A range of identifiers 62 (i.e., hash range) defines a bucket 64. The identifier space 60 comprises a plurality of buckets 64.

For example, in operation, each object 80 may be associated with a name that is supplied by the client when the object 80 is uploaded to the system 10. Objects 80 may be organized into a two-level hierarchy. The first level (i.e., bucket level) is conceptually similar to a folder or directory in traditional file type storage systems. The second level is the object 80 itself. The object identifier 62 may therefore be calculated by applying a hash algorithm on the object name and the bucket name in which the object 80 is stored. The bucket name may be prefixed to the object name and the resulting text is passed to the hash algorithm, which maps the input text to a hash value. The hash value may therefore be the unique identifier 62 for the object 80.

The mapping module 50 is also configured to generate the routing table 70. Each bucket 64 is associated with one or more storage locations 20 of a plurality of storage locations 20, as well as with a timestamp 32. The routing table 70 thus correlates each bucket 64 with an associated storage location at any given time, or period of time. That is, the routing table 70 keeps track of which bucket 64 is associated with which storage location and when. An illustrative routing table 70 is shown, for example, below:

| vNode/Hash Range | Routing |
|---|---|
| A1 | [{time:T, disk:disk1}, {time:T1, disk:disk2}] |
| A2 | [{time:T, disk:disk1}] |
| B1 | [{time:T, disk:disk2}, {time:T2, disk:disk3}] |
| C1 | [{time:T, disk:disk4}] |

As can be seen in the above routing table 70, bucket A1 has been associated with disk 1 as of time T, and with disk 2 as of time T2.

The mapping module 50 may therefore include the hash algorithm for mapping the object name to the unique identifier 62, and a routing module for finding the current storage location for the object 80 based on the object's identifier 62 and its timestamp 32.

As also shown schematically, for example in FIG. 2, for time t' such that $t_0 \leq t' < t_1$, the routing table 70 may associate bucket α with storage location A, while for a later time t" such that $t_1 \leq t'' < t_2$, the routing table 70 may associate bucket α with storage location B.

The mapping module 50 is further configured to assign one of the unique identifiers 62 to each data object 80, which associates the data object 80 with one of the buckets 64. The mapping module 50 thereafter routes the data object 80 to the appropriate storage location based on the associated bucket 64 and the associated timestamp 32 in accordance with the routing table 70. The data object 80 is thereafter stored in the associated storage location.

Returning to FIG. 2, for example, the data object 80 may be assigned a timestamp 32 of t' and a unique identifier 62 of "08." The unique identifier "08" associates the data object 80 with bucket α of the identifier space 60. The mapping module 50, based on the routing table 70, would then route the data object 80 to be stored in storage location A—as the routing table 70 instructs that bucket α objects 80 at time t' should be stored in disk A. However, if the data object 80 has a timestamp 32 of t", the mapping module 50 would route the data object 80 to be stored in storage location B—as the routing table 70 instructs that bucket α objects 80 at time t" are routed to disk B.

The routing table 70 may be user accessible via known techniques and thereby may be modified by the user to change the correlation between each bucket 64 and its associated storage location at given time periods. Thus, as shown for illustrative purposes in FIG. 3, at some time t', the routing table 70 in some embodiments may comprise a first state of bucket 64 and storage location correlations, while at some later time t", the routing table 70 may comprise a second state of bucket 64 and storage location correlations.

The user may therefore reallocate which buckets 64 are associated with which storage locations 20. It will be understood that reallocation is not limited to user implemented or manual reallocation, but also includes automated reallocation based on predetermined conditions (e.g., system detected uneven usage of storage locations 20, low remaining storage capacity, the addition of a new storage location, etc.).

Figure 3:
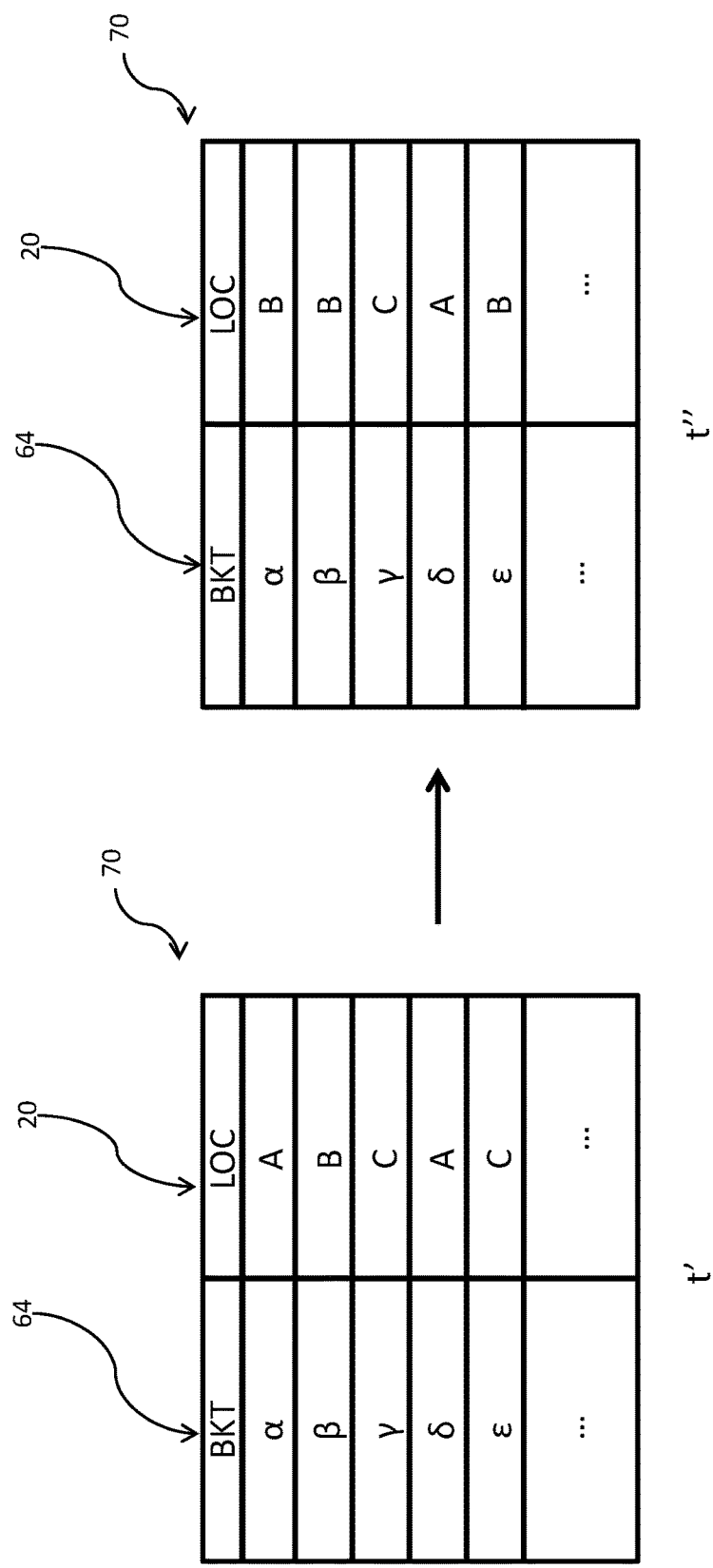
FIG. 3 is a schematic representation of a routing table being modified according to at least one embodiment of the present invention.

In some embodiments, the modified routing table 70 replaces the routing table 70 for data objects 80 incoming to the storage system 10 after the modification. An exemplary routing table 70 modification according to such embodiments is schematically illustrated in FIG. 3.

Figure 5:
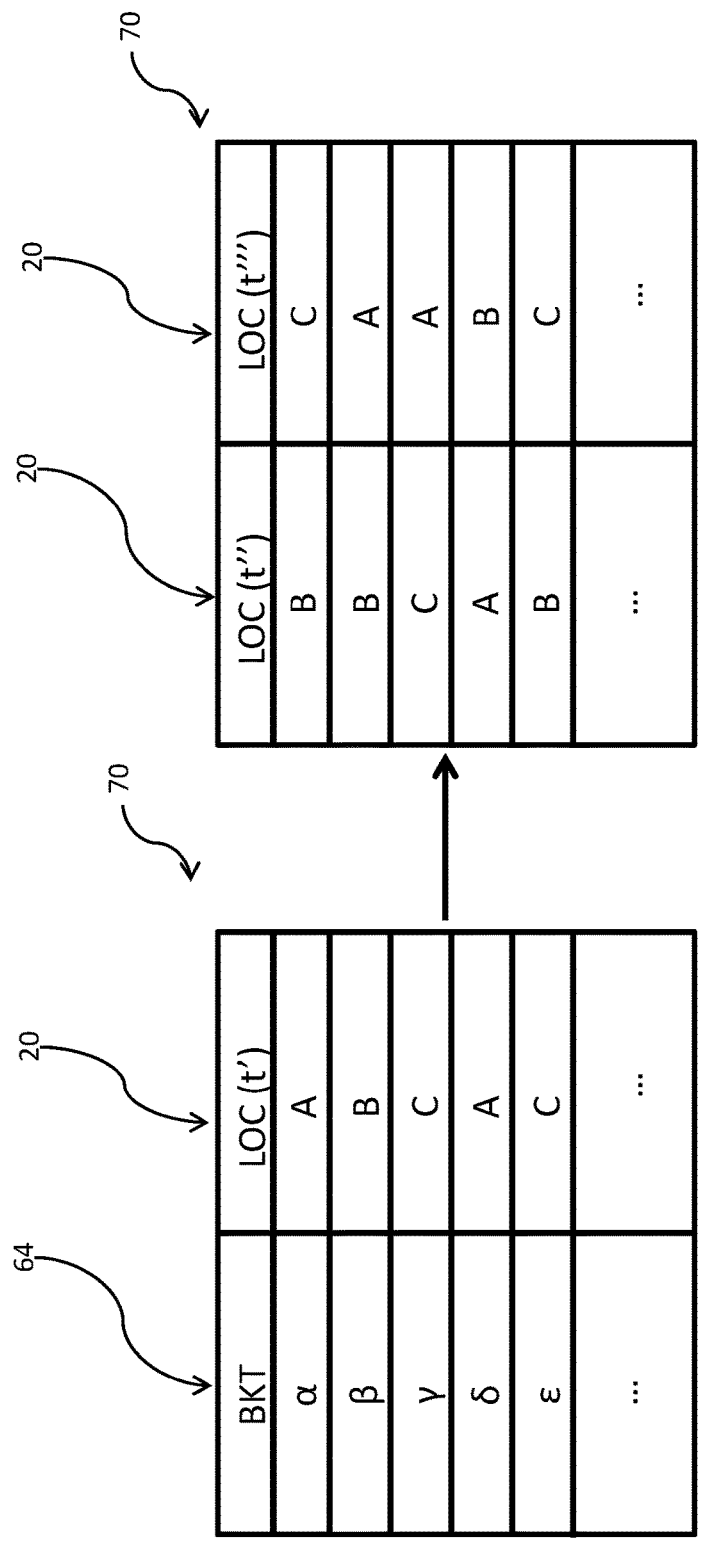
FIG. 5 a schematic representation of a routing table being modified according to at least one embodiment of the present invention.

In some embodiments, the modified routing table 70 adds to the routing table 70. An exemplary routing table 70 modification according to such embodiments is schematically illustrated in FIG. 5. Thus, as shown for illustrative purposes in FIG. 5, at some time t', the routing table 70 may comprise bucket and storage location correlations for time t', while at some later time t", the routing table 70 may comprise bucket and storage location correlations for times t' and t".

In this manner, incoming data objects 80 may be dynamically routed to storage locations 20 based at least partially on the timestamps 32 of the data object 80. Thus, at the later time when buckets 64 are reallocated to different storage locations 20, the data objects 80 already stored need not also be reallocated. The already stored data objects 80 may remain in their respective storage locations 20, as determined by the routing table 70 correlations at the time they were stored, while new incoming data objects 80 will at the later time be stored according to modified routing table 70 correlations associated with that later time. Existing data objects 80 (i.e., older timestamped versions) remain accessible from the old storage location for the hash bucket 64.

The system 10 is also be configured to recall the data object 80 from the storage location. The mapping module 50 may be configured to determine the appropriate bucket 64 based on the unique identifier 62. The mapping module 50 may also be configured to determine the appropriate storage location via the routing table 70 based on the determined appropriate bucket 64 and the timestamp 32.

Returning to FIG. 2, in recalling the data object 80 having the unique identifier "08" and timestamp 32 of t', the mapping module 50 determines that the bucket 64 the data object 80 is stored in is a, and that a bucket items having t' timestamps 32 were stored in storage location A.

In some embodiments, the routing table 70 state is stored in a persistent storage. The entries in routing table 70 may have predefined format. At an application start-up time the routing table 70 may be loaded from persisted storage into the memory 40. The changes made to routing table 70, in accordance with the invention, are applied to the persistent storage. When a storage node is added to the system 10 it may, for example, be assigned with some hash buckets 64 based on the available storage (number of disks and their capacity) on it. The routing table 70 is thereafter initialized for this node based on its assigned hash buckets 64.

Figure 4:
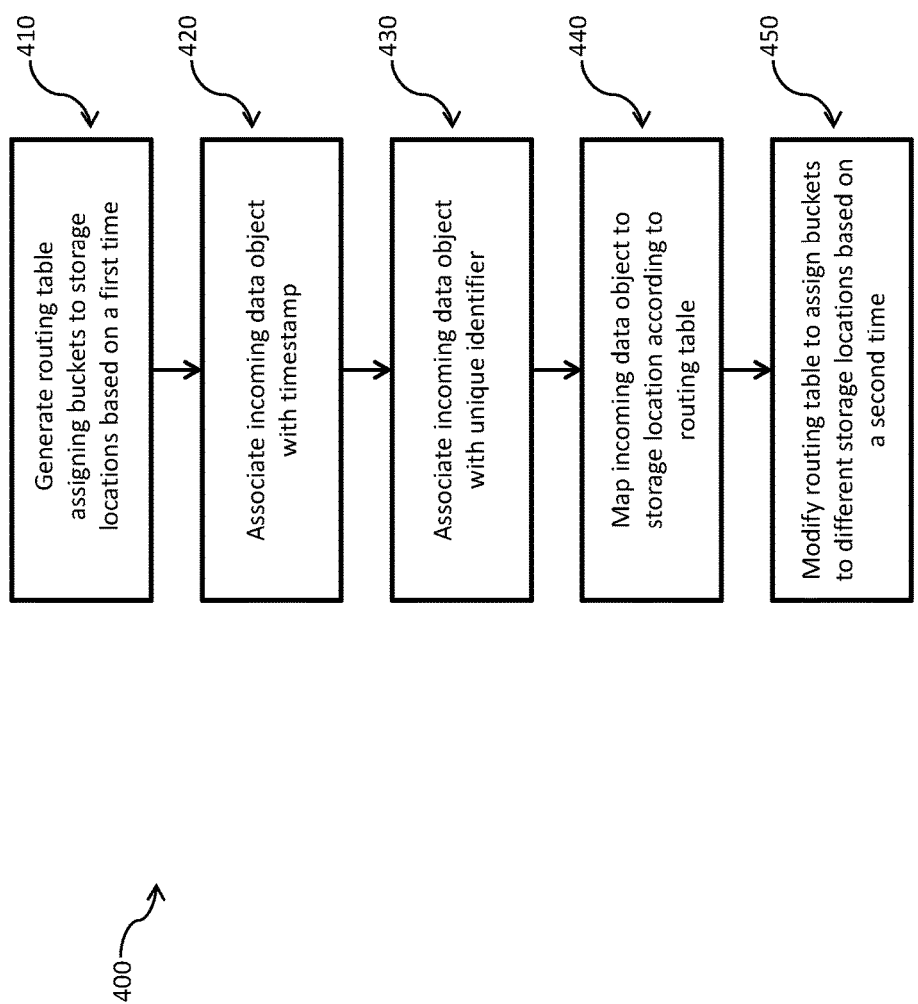
FIG. 4 is a flow-chart representation of a process according to at least embodiment of the present invention.

Referring to FIG. 4, a process 400 according to at least one embodiment will now be described.

In step 410, the mapping module 50 initially assigns each bucket 64 to one of the available storage locations 20, and generates a routing table 70 entry for that hash bucking with an initial timestamp 32. Each bucket 64 is associated with a specific storage location based on the routing table 70. The routing table 70 correlates each bucket 64 with its associated storage location at any given time. That is, the routing table 70 keeps track of which bucket 64 is associated with which storage location at for any given period of time (e.g., that all data objects 80 with timestamps 32 from $t_0$ to $t_1$ and assigned to bucket α are stored on disk A, while all data objects 80 with timestamps 32 from $t_2$ to $t_3$ and assigned to bucket α are stored on disk B).

In step 420, a data object 80 is provided to the data object storage system 10 for storage, and the clock module 30 associates the incoming data object 80 with a timestamp 32.

In step 430, the mapping module 50 associates the incoming data object 80 with a unique identifier 62 (e.g., via a hash algorithm). The unique identifier 62 is selected from a sequence of unique identifies that form an identifier space 60 (e.g., a hash value space), a range of which (i.e., hash range) defines a bucket 64.

In step 440, the mapping module 50 maps the incoming data object 80 to an appropriate storage location. This mapping is based on the routing table 70, the unique identifier 62 associated with the data object 80, and the timestamp 32 associated with the data object 80. An appropriate bucket 64 for the data object 80 is determined based on the unique identifier 62 associated with the data object 80. The appropriate storage location is determined based on the storage location that is correlated, via the routing table 70, with the appropriate bucket 64 for the time indicated by the timestamp 32 associated with the data object 80. In other words, if the routing table 70 indicates that at the time of timestamp t' data objects 80 associated with bucket α are stored in storage location A, then the data object 80 associated with bucket α and having timestamp t' will be routed to storage location A. If, however, the routing table 70 indicates that at the time of timestamp t' data objects 80 associated with bucket α are stored in storage location B, then the data object 80 associated with bucket α and having timestamp t' will be routed to storage location B.

In step 450, the routing table 70 is modified to reflect a different correlation of buckets 64 and storage locations 20. In other words, a bucket 64 that was previously associated with one storage location may now be associated with a different storage location—and all newly incoming data objects 80 assigned to the bucket 64 will be stored in the different storage location. It will be understood, however, that already stored data objects 80 associated with the bucket 64 need not be transferred to the different storage location. Instead, the routing table 70 keeps track of which buckets 64 are associated with which storage locations 20 at which times, so that reference to the proper storage location can always be made. New data objects 80 to the hash bucket 64 are thus stored in the new storage location, while existing data objects 80 are accessed from old storage locations 20, using the routing table 70.

In this manner, the timestamp 32 of the incoming data object 80 is made use of to dynamically route incoming data objects 80 to storage locations 20 more efficiently and effectively than previously known. The ability of the system 10 to efficiently store object data is therefore much improved. One particular advantage is that any given data object 80 may potentially reside on any given storage location at any given time. This advantage is due to the system 10 tracking the data object's location via the routing table 70, utilizing its timestamp 32. When the data object 80 is updated, for example, a corresponding new object 80 with a new timestamp 32 may be stored on the same, or another storage location. As the routing table 70 keeps track of the timestamp 32 and storage location for that object 80, and associates both with the bucket 64, only the token pointers need be moved rather than the objects 80 themselves.

In some embodiments, such modifications to the routing table 70 may be initiated because the system 10 determined that a particular bucket's storage location utilization is greater than a calculated overall average disk utilization by a predetermined threshold value. The data object store system 10 is configured to periodically survey the disk usage in order to make such a determination. The survey periods may be static, dynamic, event contingent, or otherwise configurable. The threshold value may likewise be static, dynamic, event contingent, or otherwise configurable.

The embodiments described in detail above are considered novel over the prior art of record and are considered critical to the operation of at least one aspect of the invention and to the achievement of the objectives of the invention. The words used in this specification to describe the exemplary embodiments are to be understood not only in the sense of their commonly defined meanings, but also to include any special definition with regard to structure, material or acts that would be understood by one of ordinary skilled in the art to apply in the context of the entire disclosure.

The definitions of the words or drawing elements described herein are meant to include not only the combination of elements which are literally set forth, but all equivalent structures, materials or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim without departing from the scope of the invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a non-transitory computer readable medium, including any available media accessible by a computer that can be used to store desired program code in the form of instructions, data structures or the like. Thus, certain aspects may comprise a computer program product for performing the operations presented herein, such computer program product comprising a non-transitory computer readable medium having instructions stored thereon, the instructions being executable by one or more processors to perform the operations described herein. It will be appreciated that software or instructions may also be transmitted over a transmission medium, as is known in the art. Further, modules and/or other appropriate means for performing the operations described herein may be utilized in implementing the functionalities described herein.

The scope of this description is to be interpreted in conjunction with the appended claims.

What is claimed is:

1. A computer-implemented process for dynamically routing data objects to storage locations making up a storage cluster that is associated with a plurality of buckets, the process comprising:

assigning a unique identifier value and a timestamp value to an incoming data object;

determining a bucket value for the data object based on the unique identifier value, the bucket value assigning the data object to a bucket from among the plurality of buckets;

associating the data object with a storage location, configured to physically store the data object, from among a plurality of storage locations available on the storage cluster, wherein the association is determined from the bucket value and the timestamp value;

routing the data object to the storage location for storage therein; and in response to an imbalance in a fill rate of the plurality of buckets, subsequently associating the bucket with a different storage location from among the plurality of storage locations available on the storage cluster, wherein the bucket is temporally associated with one or more of the plurality of storage locations such that subsequently associating the bucket with the different storage location is accomplished without migrating the data object between the storage location and the different storage location.

2. The process according to claim 1, further comprising: generating a routing table that associates the bucket with the storage location for the timestamp value, wherein said determining the storage location includes consulting the routing table.

3. The process according to claim 2, further comprising: retrieving the data object from the storage location based on the bucket and the timestamp value based on the routing table.

4. The process according to claim 1, further comprising: retrieving the data object from the storage location based on the bucket and the timestamp value.

5. The process according to claim 4, wherein retrieving the data object from the storage location includes performing a look-up operation on the routing table that associates the bucket with the storage location for the timestamp value.

6. The process according to claim 1, wherein the unique identifier is a hash value, and the bucket is a hash bucket of a hash value space.

7. The process according to claim 2, further comprising: associating, via the routing table, the bucket with the different storage location for a different timestamp value.

8. The process according to claim 7, wherein associating the bucket with the different storage location occurs after routing the data object.

9. The process according to claim 8, further comprising: retrieving the data object from the storage location based on the bucket and the timestamp value via consulting the routing table.

10. The process according to claim 7, further comprising: determining that a storage utilization of the bucket exceeds than an overall storage utilization by a predetermined threshold value, wherein associating the bucket with the different storage location occurs after the threshold value is determined to be exceeded.

11. The process according to claim 2, further comprising: associating, via the routing table, the bucket with the storage location as of an initialization time prior to the timestamp value.

12. The process according to claim 11, further comprising: associating the bucket with the different storage location as of a later time after the timestamp value.

13. The process according to claim 12, wherein associating the bucket with the different storage location occurs after routing the data object.

14. The process according to claim 13, further comprising: retrieving the data object from the storage location based on the bucket and the timestamp value via consulting the routing table.

15. The process according to claim 11, further comprising: determining that a storage utilization of the bucket exceeds than an overall storage utilization by a predetermined threshold value, wherein associating the bucket with the different storage location occurs after the threshold value is determined to be exceeded.

16. The process according to claim 2, further comprising:
associating, via the routing table, the bucket with the different storage location for a second timestamp value;
assigning a second unique identifier value and the second timestamp value to an incoming second data object;
determining the bucket for the second data object based on the second unique identifier value;
determining the different storage location from among the plurality of storage locations, the determination based on the bucket and the second timestamp value;
routing the second data object to the different storage location for storage therein.

* * * * *